United States Patent Office

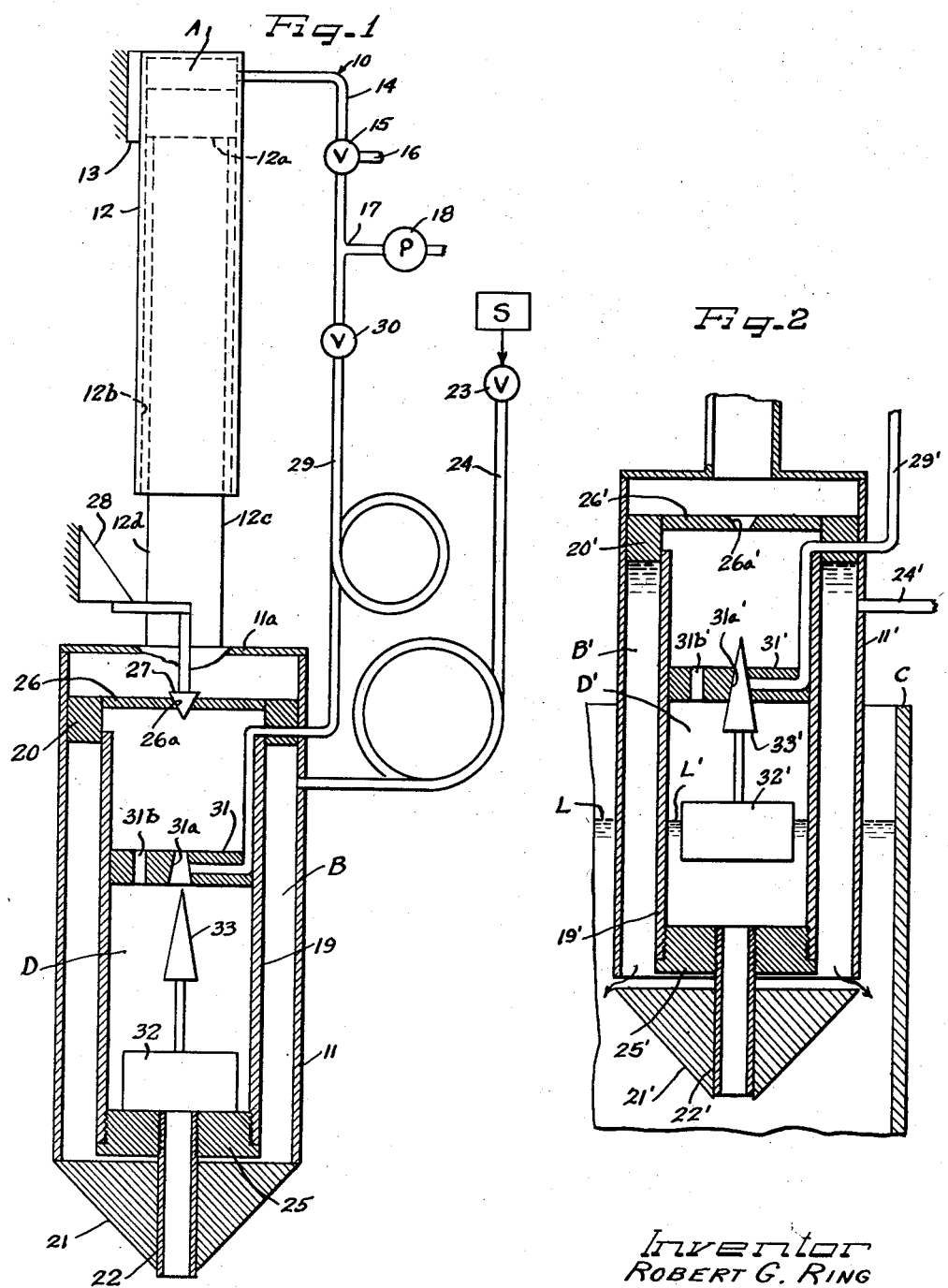

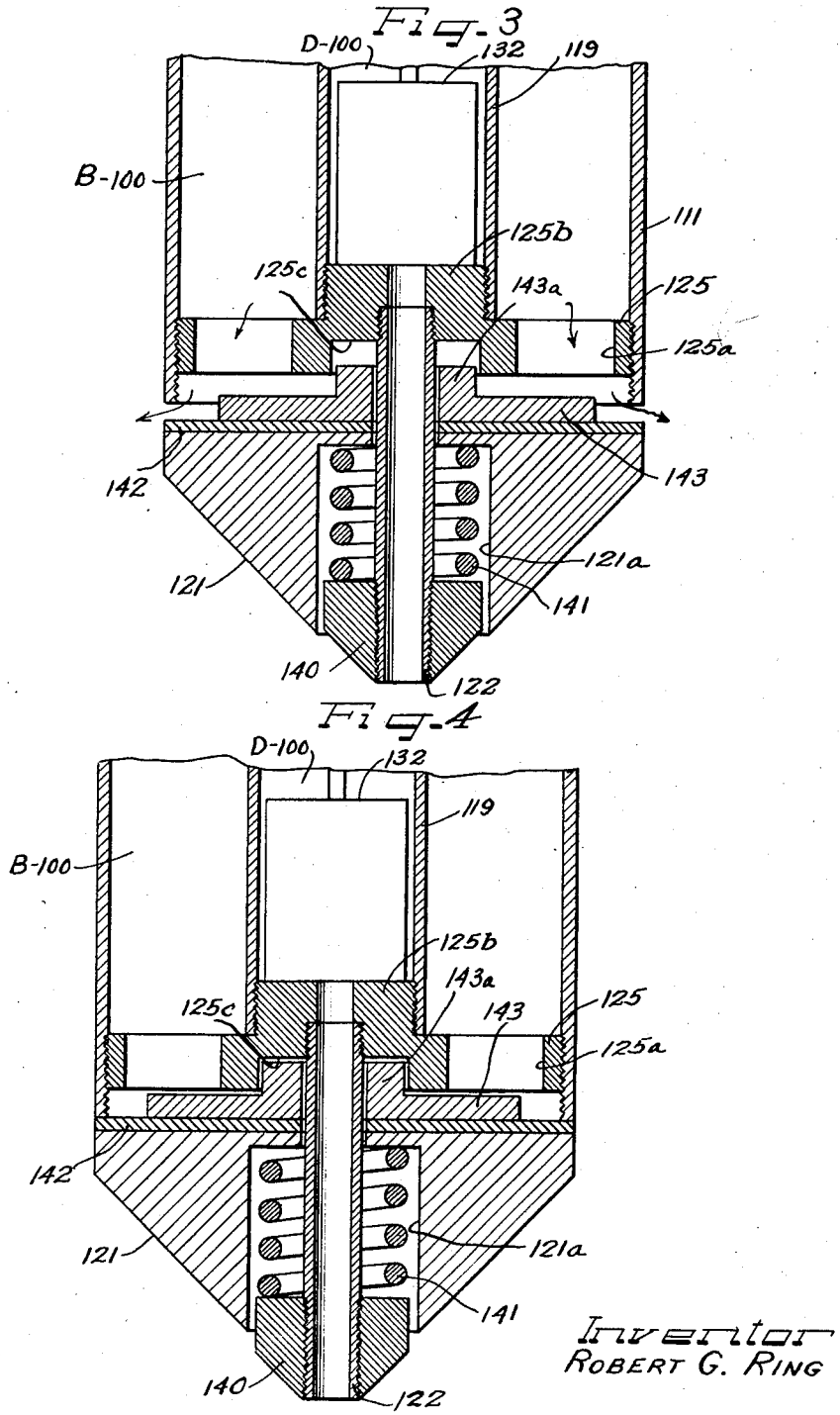

2,930,414
Patented Mar. 29, 1960

2,930,414

LIQUID FILLING DEVICE

Robert G. Ring, Whitehaven, Tenn., assignor to Chapman Chemical Company, Memphis, Tenn., a corporation of Illinois Application July 26, 1957, Serial No. 674,437

9 Claims. (Cl. 141—116)

This invention relates to an improved device and method for filling containers, and more particularly, to an improved method and device for sub-surface introduction of a liquid into a container rapidly and without foaming or similar difficulties.

The instant method and device may be used for filling barrels, drums, or similar shipping and storage devices. Heretofore, the usual practice was to fill barrels or drums with liquid by gravity flow, but such procedures are relatively slow and for this and other reasons leave something to be desired.

Attempts have been made to pump liquid under pressure, but this often leads to air occlusion in the liquid, with resulting foam production in the case of many liquids.

In U.S. Patent No. 2,702,684 issued to MacLeod et al. on February 22, 1955, there is described a sub-surface filling method and apparatus allegedly employed for rapid liquid filling of containers. The MacLeod device is actuated by electric circuits operated in response to signals from a weighing scale. The device thus depends upon a number of variables for its operation and involves a relatively complicated and expensive circuit and signal system.

In contrast, the instant invention resides in a greatly simplified device and method for the operation thereof. For example, the withdrawal of the MacLeod filling tube is dependent upon the filling of the container with a certain predetermined weight of liquid, whereupon the scale signals the withdrawal mechanism and the withdrawal of the tube is initiated. In contrast, in the instant device withdrawal of the filling tube is effected in response to actuating means sensing the liquid level in the container. As the liquid level rises, the tube is withdrawn, so that when the container reaches nearly filled condition, the tube is practically withdrawn therefrom, and the withdrawal of the tube from the container is not initiated at the time that the container is nearly filled (but instead is practically complete at this time).

The instant device is also simply constructed and sturdy and easily operated without the necessity for complicated circuits and the like.

It is, therefore, an important object of the instant invention to provide an improved method and apparatus for sub-surface introduction of liquid into a container.

It is a further object of the instant invention to provide an improved filling device for introduction of liquid into a container, comprising an elongated vertically positioned filling tube, a foot valve affixed to the lower end of said tube, means for opening and closing the foot valve, whereby liquid flowing through the tube while in its lowered position may be introduced into a container at a point beneath the liquid level in the container in control of means for vertically raising said filling tube for raising the tube in response to increases in the liquid level in the container.

Yet another object of the instant invention is to provide an improved method for sub-surface introduction of liquid into a container, comprising inserting a filling tube to a point near the bottom of a container, flowing liquid through said inserted filling tube to immerse the bottom of the tube in liquid, continuously sensing the liquid level in the container, and continuously moving the filling tube upwardly, while maintaining the bottom of the tube immersed, in response to increases sensed in the level of liquid in the container.

Other and further objects, features and advantages of the present invention will become apparent to those skilled in the art from the following detailed disclosure thereof and the drawings attached hereto and made a part hereof.

On the drawings:

Figure 1 is an essentially diagrammatic view, showing a filling device embodying the instant invention in elevation with parts shown in section and parts broken away;

Figure 2 is a diagrammatic view showing another position of the filling tube and associated elements shown in Figure 1;

Figure 3 is a sectional elevational detail view of the foot valve and associated elements shown only diagrammatically in Figures 1 and 2, the foot valve being shown in the open position; and Figure 4 is a view comparable to Figure 3 showing the foot valve in the closed position.

As shown on the drawings:

In Figure 1, a filling device indicated generally by the reference numeral 10 comprising an elongated vertically positioned filling tube 11 (which is here shown in disproportionately great width and disproportionately short length for purposes of simplifying the diagrammatic view) and an air cylinder 12 adapted to vertically lower and raise the filling tube 11. The air cylinder 12 is mounted in firm assembly on a fixed bracket 13, so that it is not moved during the operation of the device 10, but the piston 12a therein axially received by the cylinder 12 moves relative thereto in response to changes in air pressure in a head chamber A at the top of the piston 12a. The downward movement of the piston 12a is limited by a stop 12b at the bottom end of the cylinder 12. The piston 12a is connected to a tubular piston rod element 12c which is connected directly to the top of the filling tube 11, here designated by the reference numeral 11a, by welds or other suitable means (not shown), so that the tube 11 moves in direct response to the movement of the piston 12a.

The head chamber A of the air cylinder 12 is connected to an air line 14 which contains a three-way valve 15. The three-way valve 15 has a first position wherein it connects the air line 14 directly to ambient atmosphere through a line 16; and it has a second position wherein it closes off the ambient atmosphere in the line 16 and affords communication between the air line 14 and a T 17 to which is connected a vacuum pump 18, which serves to create a vacuum in the chamber A and cause the piston 12a to move upwardly. When the valve 15 is turned to the first position, however, the effect of the suction pump 18 is shut off and ambient atmosphere communicates with the chamber A, so that the piston 12a may move downwardly.

Referring now to the tube 11, it will be seen that an interior tube 19 is mounted concentrically within the filling tube 11 secured to an annular support member 20 by welds or other suitable means (not shown). The annular member 20 forms a seal between the inner tube 19 and the outer tube 11 at the top of the inner tube 19, so that a filling chamber of annular cross-section is provided between the tubes 11 and 19. At the bottom of the tube 11 is mounted a foot valve 21, which is a generally frusto-conical member axially movable on a central tubular conduit 22. The details of this structure 21, 22 are brought out in Figures 3 and 4, which will be discussed in detail hereinafter, but it is sufficient for the present purposes to note that the foot valve 21 may move from the closed position shown in Figure 1 downwardly a short distance to an open position shown in Figure 2, wherein the parts that are the same as parts shown in Figure 1 (although possibly in a different position) are designated by primed reference numerals corresponding to the reference numerals used in Figure 1. Liquid used to fill a container is provided from a source S shown diagrammatically through a valve 23 and a flexible liquid inlet line 24. The liquid inlet line 24 feeds into the annular chamber B through the side wall of the tube 11. When the valve 23 is opened liquid fills the entire chamber B and urges sufficient pressure against the foot valve 21 to open the foot valve 21 and thus flow out into a container. In this way the foot valve 21 is operated (by operation of the valve 23). As is shown in Figure 2, the chamber B' is filled with liquid and the foot valve 21' is open so that liquid flows therefrom (as indicated by the arrows) into a container below the level L of liquid therein. The flexible fluid inlet line 24 is connected at the top of the tube 11, so that the liquid may enter the top portion of the tube (indicated as 11' in Figure 2) and flow out the bottom portion of the tube 11' past the foot valve 21' beneath the liquid level L. Although the sequence will be described in detail hereinafter it will be appreciated that the tube 11 is first lowered to near the bottom in the container and then the valve 23 is opened so as to start the flow of liquid into the container.

The interior tube 19 is closed off at its bottom by a ring 25 threadedly engaging the interior thereof. The ring 25 threadedly receives the top of the tubular conduit 22. At the top of the interior tube 19 there is mounted a closure plate 26 carried by the ring 20. The closure plate 26 has a central aperture 26a which, in Figure 1, is closed by a valve element 27 carried by a stationary bracket 28. It will thus be appreciated that the valve 26, 27 is closed only in the position shown in Figure 1, which is the "standing" position where the piston 12a is located in its top position. Once the piston 12a and tube 11 start downwardly the valve 26, 27 is opened. The bracket 28 mounts the valve element 27 at one side of the piston rod 12c so that it will not interfere with the piston rod 12c during its entire movement up and down in the cycle of the operation of the device 10.

In the position shown in Figure 1, air from the atmosphere can enter into a central chamber D defined by the interior tube 19 only through the tubular conduit 22 at the bottom thereof. A vacuum line 29 (which is also a flexible line to accommodate movement of the tube assembly 11) is connected to the suction of the pump 18 through the T 17 via a control valve 30 and passes through the side wall of the tube 11 and through the ring 20 down to a valve member 31 in the form of an annular element secured to the middle interior of the tube 19 and having a central aperture 31a. The vacuum line 29 communicates with the central aperture 31a and via the aperture 31a with the interior chamber D. In the position shown in Figure 1, the control valve 30 is throttled so as to continuously draw air through the tubular conduit 22 and the chamber D. The float member 32 is obviously a relatively light member and a pressure differential of warm atmosphere thereacross would easily cause slight lifting of the float member 32 so as to allow air to pass, even if intermittently such as in the case of the lid on a pot of boiling water. In this way liquid which has collected in the tubular conduit 22, within the chamber D, and on the outside of the device 10 is prevented from flowing back off the bottom of the tubular conduit 22. As will be appreciated, this procedure takes place only in the position shown in Figure 1, when the valve 26, 27 is closed. Once the valve 26, 27 is opened by initial downward movement of the tube 11, the slight vacuum within the chamber D is lost. An additional aperture 31b is provided at one side of the annular valve member 31 for equalizing the air pressure above and below the annular member 31 in the interior chamber D.

As shown in Figure 2, once the tube 11' has been lowered and the foot valve 21' forced open by feeding liquid into the tube 11' through the liquid inlet line 24', liquid fills the container C to a level L. This results in a flow of liquid up through the tubular conduit 22' and into the interior chamber D', so that the liquid level L' therein is substantially the same as the liquid level L within the container C. A float 32' within the chamber D' is thus moved upwardly by the liquid therein and the float 32' carries a valve element 33' which functions with the aperture 31a' and the vacuum line 29' as a valve for throttling the flow of air into the vacuum line 29', in the position shown in Figure 2. When the float valve element 33' reaches the position shown in Figure 2, the tube 11' is automatically raised. Actually, the air from the atmosphere enters the chamber D' through the aperture 26a', and would ordinarily flow directly into the suction line 29', so as to provide enough air to satisfy the suction pump 18 and to prevent the creation of a reduced pressure in the chamber A at the head of the piston 12 (it being understood that the valve 15 is then in its second position interconnecting the air line 14 with the T 17 and closing off the ambient atmosphere through the line 16). When the float valve element 33' rises to the position shown in Figure 2, however, the free flow of air into the suction line 29' is prevented and a reduced pressure is created in the line 29'. This causes a reduction in pressure at the T 17, the air line 14 and the head chamber A, thus resulting in lifting of the piston 12a. As soon as the piston 12a moves the tube 11 upwardly a sufficient distance, the liquid level L' within the interior chamber D' is lowered and the float valve element 33' no longer throttles the valve 31', 33'.

For simplification of further description of the invention, a cycle of the operation of the device 10 will be described.

Starting with the "standing" or up position shown in Figure 1, it will be seen that the valve 23 is closed so that no liquid feeds into the chamber B and the foot valve 21 remains closed. The valve 26, 27 is closed and the valve 30 is throttled so as to draw air slowly through the tubular conduit 22 to prevent drippage of liquid therefrom. The valve 31, 33 is also open in this position so as to accommodate the slow flow of air into the vacuum line 29. Also, the valve 15 is set in the second position whereat it connects the air line 14 with the suction of the pump 18 so as to maintain a reduced pressure in the chamber A and to hold the piston 12a at the uppermost position.

Next, the various valves are moved to the "start down" position. This is accomplished by first switching the valve 15 to its first position which permits ambient atmosphere to enter the top piston chamber A through the line 16, 14, so that the piston 12a may start downwardly. This results instantly in the opening of the valve 26, 27 so as to lose the slight vacuum in the interior chamber D.

The tube 11 continues to descend (by gravity) until it reaches the "bottom" position, whereat the tube 11 is approximately at the bottom of the container C and the liquid flow is started. In this position the valve 26, 27, the valve 31, 33 and the valve 30 are all open so as to provide a sufficient amount of air to satisfy the suction pump 18. The valve 15 is switched back to its second position, so that the air line 14 communicates with the T 17, but the vacuum pump 18 is unable to create an appreciable reduced pressure in the chamber A because it is being satisfied by air passing through the chamber D within the tube 11. The liquid control valve 23 is then opened so as to fill the chamber D and automatically open the foot valve 21.

In the next position, which is shown in Figure 2, the float 32' rises with the liquid level L' within the chamber D' so as to throttle the valve 31', 33'. This position is called the "float rises" position and it results in a throttling of the valve 31', 33' so as to create a reduced pressure in the vacuum line 29' and thus a reduced pressure in the piston head chamber A, so as to cause the piston 12a to start upwardly. As previously mentioned, as soon as the piston 12a has moved upwardly an appreciable extent, the level L' of liquid within the interior chamber D' will fall off so that the valve 31', 33' opens and the piston 12a no longer rises. These elements are synchronized through proper aperture sizes and the like so that the piston 12a is prevented from drifting downward during this filling operation. In any event the level L within the container C is continuously sensed by the float 32' and the movement of the float 32' actuates the air cylinder 12, 12a. In this way the tube 11' is substantially removed from the container C when the container is substantially filled. It will be appreciated that cutoff means associated with a scale can be employed, but one of the important features of the instant invention resides in the fact that the device is so simplified in operation that an ordinary operator can cut off the liquid control valve 23 accurately merely by observing a weighing scale mounting the container C. The small amount of volume of liquid which is displaced by the bottom tip of the tube 11' is insignificant.

At the "near filled" point, the incoming liquid is cut off by closing the valve 23, which results in closing of the foot valve 21. Simultaneously, the operator closes the valve 30. Closing of the valve 30 cuts off any incoming air bleed to the suction of the pump 18 and permits the pump to very quickly act upon the piston 12a to complete the removal of the tube 11 from the container C. Actually, the liquid control valve 23 is closed first and the suction control valve 30 is closed immediately thereafter so as to contain the accelerated withdrawel of the tube 11, whereupon the assembly again reaches the position shown in Figure 1 and the valve 26, 27 is closed. Once the valve 26, 27 is closed the suction valve 30 is again opened slightly so as to create a reduced pressure in the interior of the chamber D and thus prevent any drippage of liquid from the tubular conduit 22. The assembly is then in the "standing" or starting position.

Referring now to Figures 3 and 4 wherein elements corresponding to those shown in Figures 1 and 2 are given the same reference numeral in the 100 series, it will be seen that Figure 3 shows the foot valve 121 in open position, permitting liquid to flow as indicated by the arrows. It will be noted that a spider 125 is threadedly received within the lower end of the tube 111. The spider 125 is provided with a plurality of apertures 125a through which liquid may flow adjacent the outer periphery thereof. The central portion of the spider 125 threadedly receives the upper end of a tubular conduit 122. The tubular conduit has a frusto-conical stop 140 threadedly connected to the depending end thereof in firm assembly. The foot valve element 121 is provided limited axial movement on the tubular conduit 122; and downward movement of the foot valve 121 into the position shown in Figure 3 is resiliently resisted by a spring 141 mounted in a recess 121a of the foot valve 121 and backed against the stop 140. As will also be noted, a central boss 125b on the spider 125 is threadedly received by the interior tube 119, which defines the interior chamber D–100 and which defines with the outer tube 111 the filling liquid chamber B–100.

The foot valve 121 is provided with a sealing gasket 142 which, in the view of Figure 4, sealingly engages the bottom edge of the tube 111. The gasket 142 is retained in place by an annular metal clamp 143 also slidably mounted on the tubular conduit 122 and having a central annular boss 143a which is received by an annular recess 125c formed between the spider 125 and the tubular conduit 122. In the position of Figure 3, it is apparent that the foot valve 121 is open and liquid flows freely thereby. In the view of Figure 4, however, the gasket 142 seals the bottom edge of the tube 111 to prevent the flow of liquid thereby. Since axial movement of the assembly 121, 142, 143 on the tubular conduit 122 must be freely permitted, a small amount of clearance therebetween is required, as shown in Figure 4. Since the spring 141' (of Figure 4) immediately closes the foot valve 121 as soon as pressure on the liquid in the chamber B–100 is released, a certain amount of liquid is trapped in the chamber B–100 and this liquid would be expected to flow through the clearance passages between the tubular conduit 122 and the moving elements of the foot valve 121. This is avoided, however, by the use of the annular boss 143a in the recess 125c. As soon as the pressure in the chamber B–100 reaches approximately atmospheric pressure (after the shut off of the liquid supply), then there is no pressure to force liquid back through the "reverse" passageway afforded between the elements 125 and 143, and an effective air seal is obtained, so that drippage of liquid from the foot valve 121 is avoided.

It will be understood the modifications and variations may be effected without departing from the spirit and scope of the novel concepts of the present invention.

I claim as my invention:

1. A filling device for introduction of liquid into a container, comprising an elongated vertically positioned filling tube, a foot valve affixed to the lower end of said tube, means for vertically lowering and raising said filling tube, means for opening and closing the foot valve, whereby liquid flowing through the tube while in its lowered position may be introduced into a container at a point beneath the liquid level in such container, means defining an interior chamber within said tube, conduit means affording liquid communication between said chamber and the container whereby liquid in the chamber will have a level corresponding to the liquid level in the container, and means sensing the liquid level in the chamber in control of said means for vertically raising said filling tube for raising the tube in response to increases in the liquid level in the container.

2. A filling device for introduction of liquid into a container, comprising an elongated vertically positioned filling tube, a foot valve affixed to the lower end of said tube, means for vertically lowering and raising said filling tube, means for opening and closing the foot valve, whereby liquid flowing through the tube while in its lowered position may be introduced into a container at a point beneath the liquid level, means defining an interior chamber within said tube, conduit means affording liquid communication between said chamber and the container whereby liquid in the chamber will have a level corresponding to the liquid level in the container, means sensing the liquid level in the chamber in control of said means for vertically raising said filling tube for raising the tube in response to increases in the liquid level in the container, and means for applying vacuum to said chamber while the tube is in the raised position, whereby drippage of liquid from the chamber through said conduit means is avoided.

3. A filling device for introduction of liquid into a container, comprising an elongated vertically positioned filling tube, a foot valve affixed to the lower end of said tube, means for vertically lowering and raising said filling tube, means for opening and closing the foot valve, whereby liquid flowing through the tube while in its lowered position may be introduced into a container at a point beneath the liquid level in such container, means defining an interior chamber within said tube, conduit means in said foot valve affording liquid communication between said chamber and the container whereby liquid in the chamber will have a level corresponding to the liquid level in the container, and means sensing the liquid level in the chamber in control of said means for vertically raising said filling tube for raising the tube in response to increases in the liquid level in the container.

4. A filling device for introduction of liquid into a container, comprising an elongated vertically positioned filling tube, a foot valve affixed to the lower end of said tube, means for vertically lowering and raising said filling tube, means for opening and closing the foot valve, whereby liquid flowing through the tube while in its lowered position may be introduced into a container at a point beneath the liquid level in such container, means defining an interior chamber within said tube, conduit means in said foot valve affording liquid communication between said chamber and the container whereby liquid in the chamber will have a level corresponding to the liquid level in the container, means sensing the liquid level in the chamber in control of said means for vertically raising said filling tube for raising the tube in response to increases in the liquid level in the container, and means for applying vacuum to said chamber while the tube is in the raised position, whereby drippage of liquid from the chamber through said conduit means is avoided.

5. A filling device for introduction of liquid into a container, comprising an elongated vertically positioned filling tube, a foot valve affixed to the lower end of said tube, fluid actuated means adapted to vertically lower and raise said filling tube, means for opening and closing the foot valve, whereby liquid flowing through the tube while in its lowered position may be introduced into a container at a point beneath the liquid level in such container, means defining an interior chamber within said tube, conduit means affording liquid communication between said chamber and the container whereby liquid in the chamber will have a level corresponding to the liquid level in the container, and sensing means actuating said fluid actuated means to raise the filling tube in response to increases in the level of liquid in the chamber.

6. A filling device for introduction of liquid into a container, comprising an elongated vertically positioned filling tube, means for vertically raising and lowering said filling tube, a foot valve affixed to the lower end of said tube, means for opening and closing the foot valve, whereby liquid flowing through the tube while in its lowered position may be introduced into a container at a point beneath the liquid level in such container, means defining an interior chamber within said tube, conduit means affording liquid communication between said chamber and the container whereby liquid in the chamber will have a level corresponding to the liquid level in the container, and a float valve within the chamber in control of said means for vertically raising said filling tube for raising the tube in response to increases in the liquid level in the container.

7. A filling device for introduction of liquid into a container, comprising an elongated vertically positioned filling tube, a foot valve affixed to the lower end of said tube, fluid actuated means adapted to vertically lower and raise said filling tube, means for opening and closing the foot valve, whereby liquid flowing through the tube while in its lowered position may be introduced into a container at a point beneath the liquid level in such container, means defining an interior chamber within said tube, conduit means affording liquid communication between said chamber and the container whereby liquid in the chamber will have a level corersponding to the liquid level in the container, and a float valve within the chamber actuating said fluid actuated means to raise the filling tube in response to increases in the level of liquid in the container.

8. A filling device for subsurface introduction of liquid into a container, comprising an elongated vertically positioned filling tube, an air cylinder adapted to vertically lower and raise said filling tube, pump means, a valve in control of actuation of said air cylinder connecting one end of said air cylinder selectively to ambient atmosphere and to said pump means, a foot valve affixed to the lower end of said tube, resilient means urging the foot valve closed, means feeding liquid into the top of the filling tube to overcome said resilient means and open the foot valve, whereby liquid flowing through the tube while in its lowered position may be introduced into the container at a point below the liquid level therein and sensing means actuating said air cylinder to raise the filling tube in response to increases in the level of liquid in the container.

9. A filling device for subsurface introduction of liquid into a container, comprising an elongated vertically positioned filling tube, an air cylinder adapted to vertically lower and raise said filling tube, pump means, a valve in control of actuation of said air cylinder connecting one end of said air cylinder selectively to ambient atmosphere and to said pump means, a foot valve affixed to the lower end of said tube, resilient means urging the foot valve closed, means feeding liquid into the top of the filling tube to overcome said resilient means and open the foot valve, whereby liquid flowing through the tube while in its lowered position may be introduced into the container at a point below the liquid level therein, means defining an interior chamber within said tube, conduit means affording liquid communication between said chamber and the container whereby liquid in the chamber will have a level corresponding to the liquid level in the container, a second valve in control of communication between said pump means and said chamber, and a float in said chamber in control of said second valve and actuated in response to the liquid level in the chamber.

References Cited in the file of this patent

UNITED STATES PATENTS

| | | |
|---|---|---|
| 1,010,692 | Schneider | Dec. 5, 1911 |
| 1,700,494 | Harrington | Jan. 29, 1929 |
| 1,913,656 | Boyd et al. | June 13, 1933 |
| 2,208,028 | Harrington | July 16, 1940 |
| 2,387,452 | Lundal et al. | Oct. 23, 1945 |
| 2,533,986 | Atterbury | Dec. 12, 1950 |
| 2,702,684 | MacLeod et al. | Feb. 22, 1955 |